(12) United States Patent
Magzimof et al.

(10) Patent No.: US 11,249,474 B2
(45) Date of Patent: Feb. 15, 2022

(54) SAFETY OF AUTONOMOUS VEHICLES USING A VIRTUAL AUGMENTED SUPPORT ENVIRONMENT

(71) Applicant: Phantom Auto Inc., Mountain View, CA (US)

(72) Inventors: Shay Magzimof, Palo Alto, CA (US); Paul Samuel Spencer, Modi'in (IL)

(73) Assignee: Phantom Auto Inc., Mountain View, CA (US)

( * ) Notice: Subject to any disclaimer, the term of this patent is extended or adjusted under 35 U.S.C. 154(b) by 254 days.

(21) Appl. No.: 16/191,868

(22) Filed: Nov. 15, 2018

(65) Prior Publication Data

US 2019/0179305 A1 Jun. 13, 2019

Related U.S. Application Data

(60) Provisional application No. 62/595,982, filed on Dec. 7, 2017, provisional application No. 62/696,776, filed on Jul. 11, 2018.

(51) Int. Cl.
*G05D 1/00* (2006.01)
*G05D 1/02* (2020.01)
*B60W 30/00* (2006.01)

(52) U.S. Cl.
CPC .......... *G05D 1/0044* (2013.01); *B60W 30/00* (2013.01); *G05D 1/0038* (2013.01); *G05D 1/0088* (2013.01); *G05D 1/0214* (2013.01); *G05D 1/0231* (2013.01); *G05D 1/0255* (2013.01); *G05D 1/0257* (2013.01); *G05D 1/0276* (2013.01); *G05D 2201/0213* (2013.01)

(58) Field of Classification Search
CPC .. G05D 1/0044; G05D 1/0088; G05D 1/0214; G05D 1/0038; G05D 1/0276; G05D 1/0257; G05D 1/0255; G05D 1/0231; G05D 2201/0213; B60W 30/00
See application file for complete search history.

(56) References Cited

U.S. PATENT DOCUMENTS

| 2008/0027590 | A1* | 1/2008 | Phillips | G05D 1/0088 701/2 |
| 2009/0018712 | A1* | 1/2009 | Duncan | G09B 19/167 701/2 |

(Continued)

OTHER PUBLICATIONS

Kadavasal, M.S et al., "Towards sensor enhanced virtual reality teleoperation in a dynamic environment," American Society of Mechanical Engineers, 2007, pp. 1057-1065.

(Continued)

*Primary Examiner* — Nga X Nguyen
(74) *Attorney, Agent, or Firm* — Fenwick & West LLP

(57) ABSTRACT

A virtual support element may be activated when it is beneficial to assist an autonomous drive system of the vehicle through a physical environment having one or more hazards. A remote support system generates the virtual support element (e.g., a virtual vehicle) that can be controlled through a simulated environment that corresponds to a physical environment of a vehicle. The autonomous drive system of the vehicle follows a path through the physical environment corresponding to the path of the virtual support element through the simulated environment corresponding to the physical environment.

20 Claims, 13 Drawing Sheets

(56) References Cited

U.S. PATENT DOCUMENTS

| | | | |
|---|---|---|---|
| 2016/0139594 A1* | 5/2016 | Okumura | B60W 30/00 701/2 |
| 2016/0334797 A1* | 11/2016 | Ross | G06Q 10/08 |
| 2017/0132334 A1 | 5/2017 | Levinson et al. | |
| 2017/0192423 A1 | 7/2017 | Rust et al. | |

OTHER PUBLICATIONS

PCT International Search Report and Written Opinion, PCT Application No. PCT/US2018/062139, dated Feb. 5, 2019, 17 pages.

Abid, H. et al., "V-Cloud: Vehicular Cyber-Physical Systems and Cloud Computing," Proceedings of the 4$^{th}$ International Symposium on Applied Sciences in Biomedical and Communication Technologies, ACM, 2011, 5 pages.

Brudnak, M., "Predictive Displays for High Latency Teleoperation," Proc. NDIA Ground Vehicle Systems Engineering and Technology Symposium, 2016, 17 pages.

Chen, T.L.T, "Methods for Improving the Control of Teleoperated Vehicles," Dissertation. Technische Universität München, 2015, 153 pages.

D'Orey, P.M. et al., "Hail-a-Drone: Enabling teleoperated taxi fleets," IEEE Intelligent Vehicles Symposium (IV), 2016, 8 pages.

Davis, J. et al., "The Effects of Time Lag on Driving Performance and a Possible Mitigation," IEEE Transactions on Robotics, Jun. 2010, vol. 26, No. 3, pp. 590-593.

Jose, R. et al., "A Comparative Study of Simulated Augmented Reality Displays for Vehicle Navigation," Proceedings of the 28$^{th}$ Australian Conference on Computer-Human Interaction, ACM, 2016, pp. 1-9.

Storms, J. et al., "Modeling Teleoperated Robot Driving Performance as a Function of Environment Difficulty," Science Direct, 2016, vol. 49, No. 32, pp. 216-221.

Tang, T. et al., "Teleoperated Road Vehicles: A Novel Study on the Effect of Blur on Speed Perception," International Journal of Advanced Robotic Systems, 2013, vol. 10, No. 333, pp. 1-11.

Walch, M. et al., "Autonomous Driving: Investigating the Feasibility of Car-Driver Handover Assistance," Proceedings of the 7th International Conference on Automotive User Interfaces and Interactive Vehicular Applications, ACM, 2015, pp. 11-18.

* cited by examiner

202 — Request for support is sent from physical vehicle

204 — Support system indicates ready to receive data

206 — Physical vehicle sends telemetry data

208 — Support System initiates virtual augmented support environment

210 — Physical vehicle detects presence of virtual augmented support vehicle and initiates a 'follow me' mode

212 — Support System controls coordinates of virtual vehicle in physical environment
Vehicle follows virtual vehicle

214 — Support System disengages virtual vehicle and disables it

216 — Physical vehicle detects disabling of virtual vehicle and disables 'follow me' mode

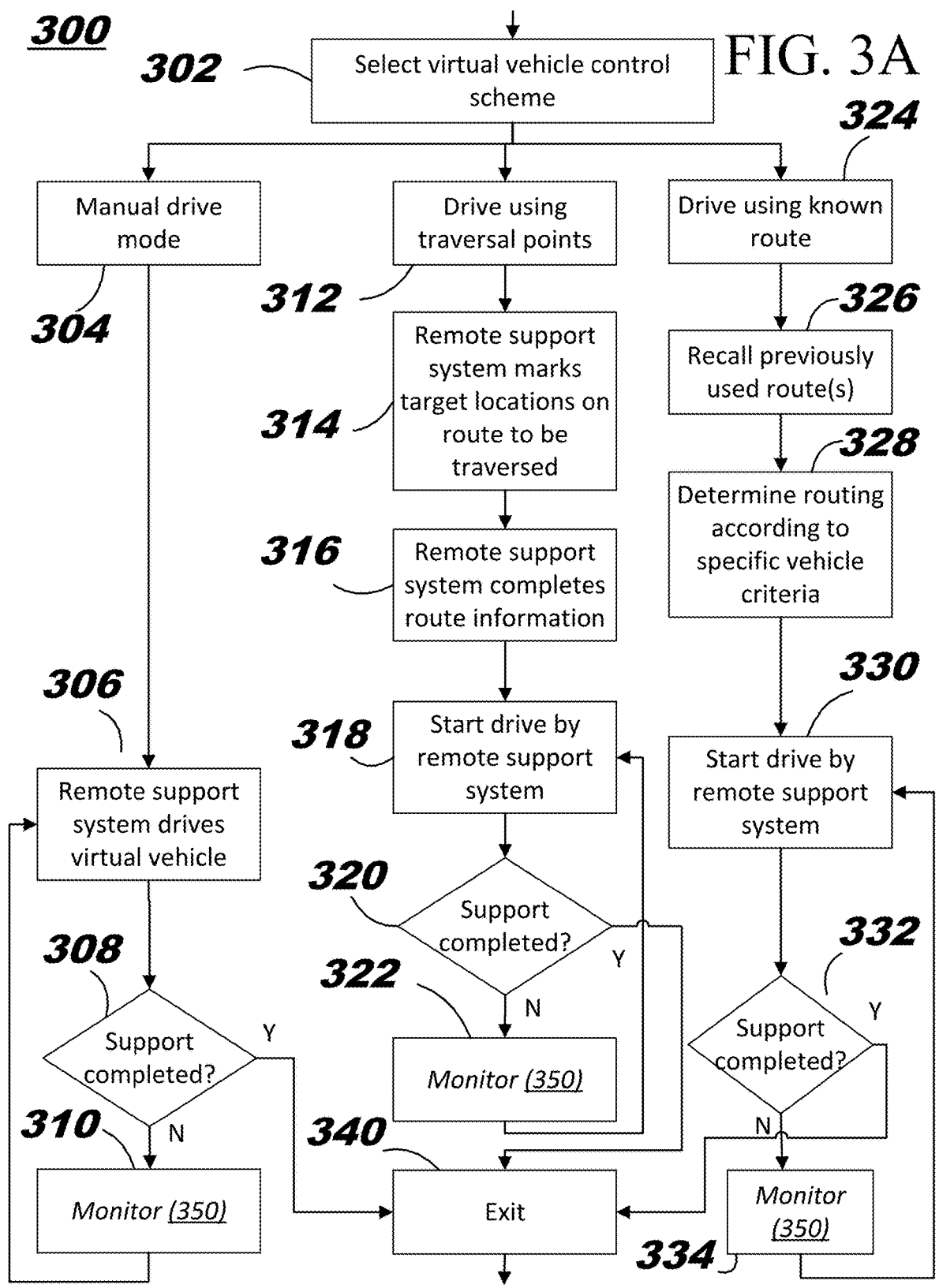

- 352 — Vehicle provides updated information from sensors
- 354 — Monitor vehicle position, speed and heading
- 356 — Remote support system updates data on local obstacles
- 358 — Remote support system updates warnings on potential danger situations
- 360 — Remote support system updates safe route information
- 362 — Remote support system updates information to vehicle on remaining support

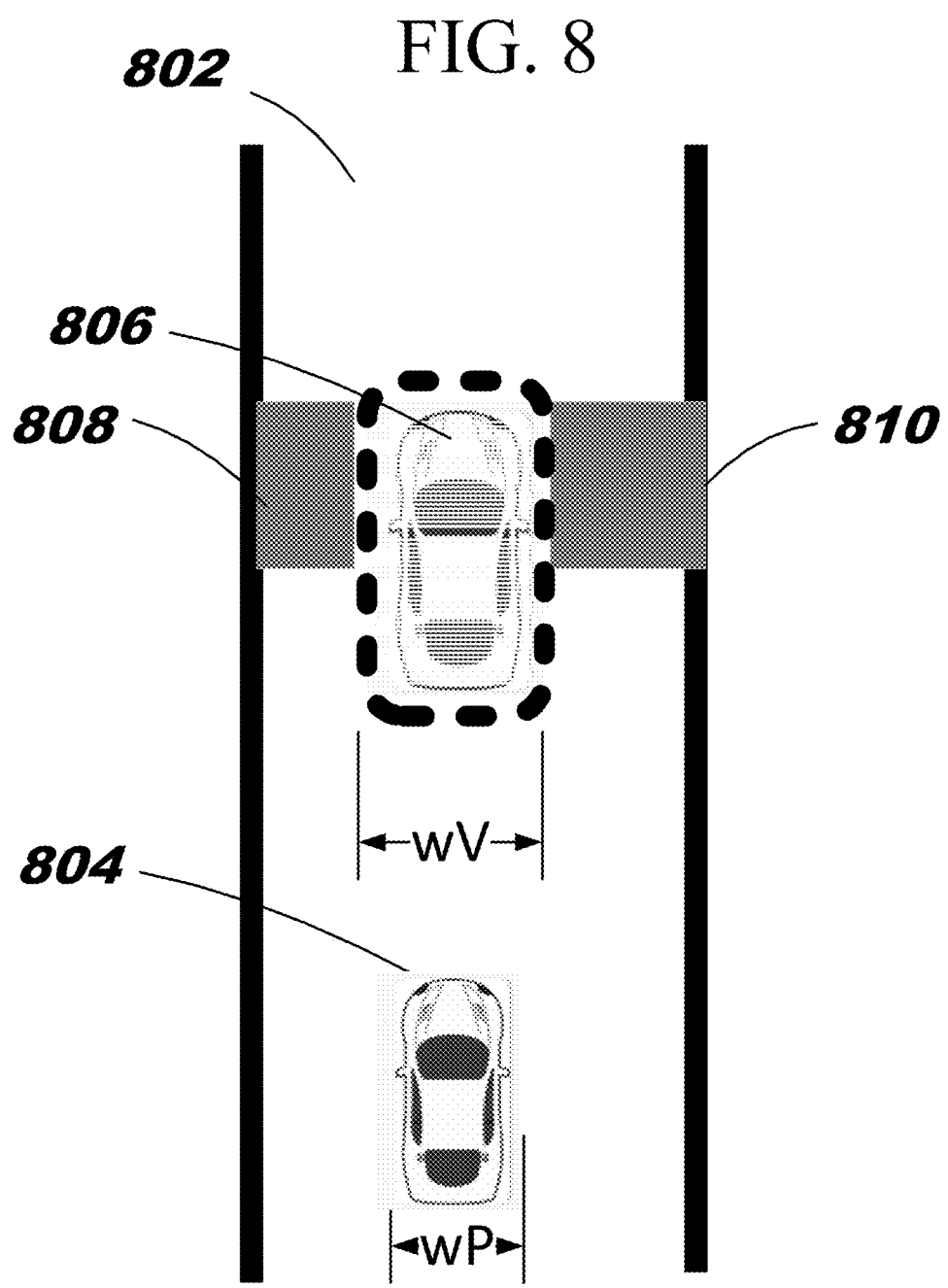

SAFETY OF AUTONOMOUS VEHICLES USING A VIRTUAL AUGMENTED SUPPORT ENVIRONMENT

CROSS-REFERENCE TO RELATED APPLICATIONS

This application claims the benefit of U.S. Provisional Application No. 62/595,982 filed on Dec. 7, 2017 and U.S. Provisional Application No. 62/696,776 filed on Jul. 11, 2018, the contents of which are incorporated by reference herein.

TECHNICAL FIELD

This disclosure describes a method and system for provision of support to autonomous vehicles that encounters various situations that the autonomous system is unable to address unaided. Support is accorded by the provision of a virtual augmented support environment that is under the supervision and control of a remote support system.

BACKGROUND

Autonomous control systems for vehicles are under development by a multitude of parties. These systems are intended to provide the possibility to transport passengers and/or materials in vehicles without the necessity for a person in the driving seat of the vehicle. Inevitably, these systems will encounter situations which the autonomous system is not able to address, such as road environments outside of the operational design domain of the autonomous system, and vehicle component issues or failures that the autonomous system is not able to address. Provision for dealing with these situations must be provided at reasonable cost, without the need for a person, with the appropriate class of driving license, to be physically present in every intelligent transport system (ITS) on the road.

SUMMARY

According to one embodiment, a method of providing remote support for a vehicle using a virtual augmented support environment is provided. The method includes a request for support from the vehicle, provision of sensor data from the vehicle to the remote support system, and initiation of a virtual augmented support environment to guide a vehicle.

In a particular embodiment, a remote support system provides remote support for controlling a vehicle through a physical environment. The remote support system receives from the vehicle, a request for support and telemetry data representing characteristics of the physical environment sensed by the vehicle. The remote support system instantiates a virtual support element superimposed on a simulated environment corresponding to the physical environment. The virtual support element is recognizable by an autonomous drive system of the vehicle. The remote support system causes the vehicle to enter a follow mode in which the autonomous drive system of the vehicle controls the vehicle to follow a path through the physical environment corresponding to a path of the virtual support element through the simulated environment. The remote support system obtains navigation controls for the virtual support element and controls navigation of the virtual support element through the simulated environment based on the navigation controls to guide the vehicle through the physical environment.

In an embodiment, the remote support system detects completion of the vehicle traversing through the physical environment. The remote support system causes the vehicle to cease recognition of the virtual support element and causes the vehicle to return to a normal mode in which the autonomous drive system controls navigation of the vehicle in absence of the virtual support element.

In an embodiment, controlling navigation of the virtual support element through the simulated environment comprises receiving manual steering and acceleration inputs from a teleoperator. The remote support system then generates the path of the virtual support element through the simulated environment in response to the manual steering and acceleration inputs.

In another embodiment, controlling navigation of the virtual support element through the simulated environment comprises receiving locations of markers in the virtual environment corresponding to locations of hazards in the physical environment. The remote support system then automatically generating the navigation controls for the virtual support element to traverse through the simulated environment while avoiding the markers.

In yet another embodiment, controlling navigation of the virtual support element through the simulated environment comprises identifying a location of the physical environment of the vehicle and obtaining, based on the identified location, a pre-recorded route through the physical environment that avoids hazards in the physical environment. The remote support system then automatically generates the navigation controls to control the virtual support element based on the pre-recorded route.

In an embodiment, the remote support system receives from the vehicle a video stream corresponding to a view of the physical environment. The remote support system generates, based on the video stream, a virtual view of the simulated environment from a perspective of a virtual driver of a virtual vehicle corresponding to the virtual support element. The remote support system presents the virtual view on a display for assisting a remote teleoperator in controlling the virtual support element. Generating the virtual view may include generating a virtual guideline superimposed on a position of the vehicle as a visual cue to assist the teleoperator support system in navigating the virtual support element.

In an embodiment, the virtual support element may be generated as a virtual vehicle having a width at least as wide as the width of the vehicle.

In another embodiment, a vehicle transmits to a remote support system a request for support and telemetry data representing characteristics of the physical environment sensed by the vehicle. An autonomous drive system of the vehicle recognizes instantiation of a virtual support element superimposed on a simulated environment corresponding to the physical environment and causes the vehicle to enter a follow mode. When operating in the follow mode, the vehicle follows a path through the physical environment corresponding to a path of the virtual support element through simulated environment.

Upon detecting completion of the vehicle traversing through the physical environment, the vehicle ceases recognition of the virtual support element, and the autonomous drive system returns the vehicle to a normal mode. When operating in the normal mode, the autonomous drive system of the vehicle controls navigation of the vehicle through the physical environment in absence of the virtual support element.

In an embodiment, recognizing instantiation of the virtual support element comprises generating a virtual perception of a support vehicle in front of the vehicle and causing the autonomous drive system of the vehicle to follow at a fixed distance behind the support vehicle.

In an embodiment, the telemetry data includes sensed vehicle data corresponding to a state of the vehicle and sensed environmental data corresponding to a state of the physical environment.

Other embodiments and aspects of different possible implementations are described in detail herein.

BRIEF DESCRIPTION OF THE DRAWINGS

FIG. 2 illustrates a flow diagram of an embodiment of a process for implementing remote support to a vehicle.

FIG. 3A illustrates a flow diagram of an embodiment of a process for controlling coordinates of a virtual vehicle in a physical environment.

FIG. 3B illustrates a flow diagram illustrating an embodiment of a process for monitoring a vehicle by a remote support system.

FIG. 8 illustrates a bird's eye view from above of the environment of the physical vehicle, and the position of the virtual vehicle within the environment, as may be provided to a support system.

DETAILED DESCRIPTION

Figure 1A:
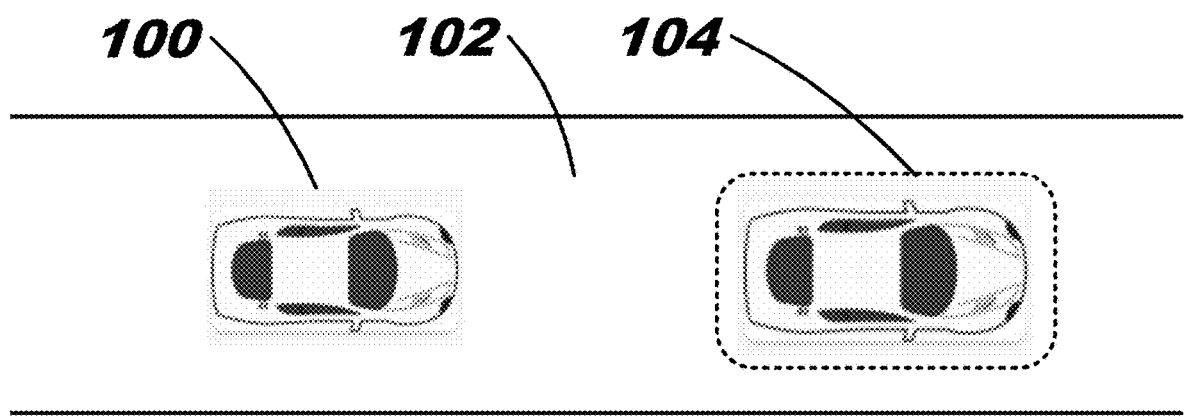
FIG. 1A illustrates a schematic view of a virtual vehicle superposed on a roadway way guiding an autonomous vehicle.

Embodiments of the present disclosure provide methods for support of vehicles, and other systems, which may typically be autonomous in operation, but which on occasions require some form of assistance from an external source. In the ongoing disclosure, usage of the term vehicle may include cars, trucks, and other land vehicles, and may also include seaborne, subterranean and airborne systems.

According to one embodiment of the disclosure, the external source may be a remotely based support system that has connectivity with a vehicle requiring assistance. The remote support system can include a natural person, a computer system, an artificial intelligence (AI) agent, or some combination. Initiation of external assistance may be triggered by several different sources. In one embodiment, the trigger may be provided by input, or inputs, provided by one or more sensors of the environment surrounding a vehicle, or system, that triggers a request from the vehicle system for assistance. In another embodiment, the trigger may be provided by input from a sensor, or sensors, of the status of a vehicle's sub-systems. In another embodiment, the trigger may be provided by a passenger of the vehicle, either manually or additionally because of a change in the status of said passenger. In a further embodiment, a trigger may be provided by some external source that is local to the vehicle. An example of this may be law enforcement or emergency services personnel. In another embodiment, the trigger may be provided by some external source not in the locality of the vehicle. An example of this may be a system wide transportation control network that may have the ability to request full or partial external override of normally autonomous systems by a remote support system.

On triggering, the vehicle provides data to the remote support system regarding the vehicle and its surroundings. The data provided may include data from a plurality of sensors. Sensor types can include sensors of the environment surrounding the vehicle, such as cameras and LIDAR, and sensors of the status of internal vehicle sub-systems, such as drive and braking systems. Alternatively, or additionally, sensor data may be processed, and may be aggregated from a plurality of sensor sources by a processing unit, before being delivered to the remote support system.

In some embodiments, the vehicle may start providing the data feed before a remote assistance request is triggered. For instance, the ITS may stream video and telemetry feeds during the whole ride, or it may start streaming data after the onboard autonomous control unit confidence level falls below a certain threshold so that the remote support system (regardless of whether it's a natural person or an AI agent) may become familiar with the road situation in advance.

In certain embodiments, trigger sources may be categorized as an emergency request or as a standard request. An example of an emergency request may be a situation that an impact has occurred with some other object, and support is urgently required. Another example is a case in which the vehicle system has detected loss of tire pressure. An example of a standard assistance call may be a request when the autonomous vehicle system requests external support in passing a particularly difficult set of obstacles, such as areas of road construction. In certain embodiments, emergency situations may be given priority in receiving assistance from external remote support support.

There are many situations that can cause triggering of a request for remote support as an emergency. One example is failure of a vehicle sensor, or a plurality of them, without which the autonomous system in the vehicle determines that is unable to address. A passenger may request assistance even in the case that the autonomous system establishes that the edge case situation is within its scope. A further example is a bug within the autonomous system whereby support is required urgently.

Passenger confidence and trust when traveling in an autonomous vehicle are a high priority in attaining rapid adoption. The passenger will be able to trigger a standard request, or in certain embodiments, an emergency request, for remote support, essentially at any time, regardless of an actual need based on autonomous system control and/or road conditions. This may be only a request for voice and/or video interaction, or may be a request for a remote support system to intercede.

There may be external local trigger events that determine a need for a remote support system to intercede with a normally autonomous vehicle. These can include instructions from road transport information and control systems to override autonomous vehicles. This might occur, for example, to make way for emergency vehicles.

In certain embodiments, there may be several concurrent support requests for external support to a remote support system. This listing of requests may be provided to the external support through some visual display that indicates all, or the top priority, assistance requests. A method may be provided for the remote teleoperator to select initiation of a connection with one of the vehicles requesting assistance.

Engagement of the remote support system with the vehicle, in some embodiments, initiates a virtual augmented support environment. This can be an element, or elements, that is not present in the physical locality of the vehicle, but is superimposed on that locality as perceived by the vehicle through its sensors. This virtual augmented support environment may include a virtual vehicle intended to be a guide which the autonomous vehicle will follow during the period of remote support. Further, a rich virtual augmented support element can be superimposed on the physical environment in the vehicle locality that includes enhanced information in addition to a follow-me element.

In one embodiment, the augmented support element may be a virtual object that has similar dimensions to that of the vehicle. In other embodiments the virtual object may be slightly larger than the vehicle to allow for a safety margin as the vehicle is passes obstacles. In some embodiments, the vehicle may have a special mode that recognizes a virtual vehicle within a virtual augmented support environment as a specialized object in its perceived environment. Additionally, the vehicle may initiate a temporary 'follow me' mode to follow the virtual vehicle while it is active.

The virtual vehicle may take the form of a virtual outline of a vehicle with similar dimensions to that of the vehicle itself. It may have a specific shape and/or color distinct from those typical in the physical environment so that it can easily be tracked. The virtual vehicle may be displayed in an isometric projection, or it may maintain the visual perspective by taking into account a remote support system's field of view, distortions introduced by camera lens, height of the camera mount above the road and other factors.

In one embodiment, the virtual vehicle position and orientation reflect the best estimate by the remote support system on their current values. When the remote support system engages the accelerator pedal from an immobile state, the video feed from the ITS does not immediately reflect that due to network latency and limited throughput, which may detrimentally affect operator performance. Adding to the ITS video feed a virtual vehicle that instantly reacts to operator commands and represents a best guess on where the vehicle is actually located and how it is actually positioned at this very moment substantially reduces the adverse effects introduced by the time lag. Such a setup can be treated as a hybrid egocentric-egocentric environment.

In another embodiment, the virtual element may have different dimensions than the vehicle. The virtual element may be a single point that has a position, but not dimensions. Alternatively, the virtual element may be represented as a line with position and length. The length of this line can be related to a dimension of the vehicle. For example, a horizontal line may take on a length that is a function of the width of the vehicle.

In another embodiment, the predictive display provides a visualization of the estimated vehicle trajectory, as, for example, a line, or as a wireframe track of a width corresponding to the width of the vehicle.

In another embodiment, the display system performs convolutions and modifications of the augmented video feed to improve performance. For instance, to mitigate the vehicle speed underestimation observed when using cameras with a small field of view, the system may use video feed blurring which has been shown to improve speed perception in egocentric environments. Furthermore, the system may perform cropping and image transformations as well as 3D modelling and rendering to simulate a video frame received from the camera located at its current estimated position to mitigate time lag effects.

The autonomous vehicle becomes aware of the presence of the virtual augmented support environment on its initiation, either by detection, or by an indication sent from the remote support system on initiation.

Virtual augmented support environment control by the remote support system can be realized using a plurality of different methods. These methods can be used in different combinations in different embodiments.

Virtual augmented support environment control can be implemented using traditional methods associated with vehicular control, such as a steering wheel to control direction of travel, and pedals to control acceleration and braking. Other methods may use different control methods, such as joysticks, touchscreens, voice control, gesture detection, and other methods.

In certain embodiments, a virtual vehicle can be controlled by other methods such as joystick, where the angle of the joystick indicates desired direction of travel. Additionally, acceleration and braking may be controlled by buttons and/or levers associated with the joystick.

Additionally, control may be achieved through virtual implementations of control elements such as the steering wheel, pedals, joysticks, buttons and levers described. These can be directed by methods such as gesture, touch and voice.

Further, the remote support system may mark out a route on a plan, for example using a touchscreen, or some other interface device.

In yet another embodiment, control on the path of the virtual augmented support environment is determined by tracking the eye movements of the remote support system.

The virtual augmented support environment provides enhanced support, in addition to a virtual vehicle element. Various embodiments may provide a plurality of information elements about the virtual vehicle, in addition to its position superposed on the physical environment. These can include vehicle speed and acceleration, current heading, and steering bearing. Additionally, information may be included about expected future modifications, for example slowing to pass obstacles, changing lane, and future turns. Such augmented reality objects may be displayed in a manner promoting better or faster perception by a robotic AI agent, therefore providing an interface for interaction of a system performing video feed analysis and object tracking with a system performing trajectory computation and vehicle control. A robotic AI agent is a device equipped with a camera unit or a plurality thereof observing the displays showing video feeds (augmented or otherwise) received from the autonomous vehicle, and a collection of actuators capable of performing the same motions, operations and gestures as human limbs in the context of interaction with the user interface. Such a solution may significantly reduce the complexity of switching between on-premises human and AI operators.

Additionally, the remote support system may have the ability to store previously traversed routes, or planned traversals in a particular local area, such as a road construction area. These traversals may be used during interactions between a vehicle requesting support and the remote support system.

There is a plurality of sensors in the vehicle providing ongoing information about the vehicle and its surroundings. These sensors may include, for example, vehicle sensors providing the status of vehicular systems, environment sensors providing data regarding the locality around the vehicle, virtual sensors that provide the virtual augmented support environment provided from the remote teleoperation system, and superimposed upon the perceived physical environment, network environment sensors that monitor the performance of the current wireless network conditions (such as cellular or LEO satellite communications), and passenger sensors that monitor, for example, breathing and cardiac activity of a passenger. Sensor measurements may be provided as an additional telemetry data stream or superimposed on one of the video feeds.

A plurality of vehicle sensors provides ongoing data on the status of the vehicle. This plurality of sensors may include steering sensors, brake sensors, velocity sensors, gear sensors, defect detectors, engine coolant temperature sensor, throttle sensor, tire pressure monitors, and similar elements.

Environment sensors may include a plurality of cameras, radars, lidars, microphones, GPS, temperature sensors, infrared sensors, smoke detectors, gas detectors, level detectors, vibration detectors, rain sensors, anemometers, altimeter, magnetic compass, inclinometer, tilt sensors, barometer, pressure gauges, motion detectors, occupancy detectors, and parking sensors.

Passenger info sensors may include microphones, gesture sensing, touchscreens, fingerprint sensors and other biometric sensors. In further embodiments, a plurality of health sensors for a vehicle may include, for example, cardiac monitors and respiratory monitors.

A plurality of scenarios may trigger conditions that require the intervention of a remote support system. Some of these scenarios may occur as a result of detecting a particular situation in the surrounding environment, a detected status of the vehicle, a passenger need, or a combination of the aforementioned.

Situations that are detected within the environment include unfavorable weather conditions such as black ice, wet road surfaces, construction zones, unexpected road conditions such as construction, unidentified objects, system overload (for example, when there are too many objects in the local environment), missing map elements, circumventing an accident on the roadway, impact or accident of the vehicle itself, geo-fencing by location or road type, need for parking assistance, and car system failure.

Other trigger situations may occur related to the vehicle system. These may include a failure of the autonomous system due to software faults or hardware issues. Additionally, a failure of one or more sensors may occur, without which the autonomous system is then outside of its operational design domain.

Passenger comfort and trust are an important factor in the adoption of autonomous vehicles. Situations may occur that, though the autonomous system is able to address a particular scenario, a vehicle passenger may elect to trigger a request for remote support.

Triggers for remote support may also occur as a result of an enquiry or instruction from a law enforcement officer, or other public safety officials.

FIG. 1A illustrates a schematic aerial view of a virtual vehicle supporting a physical vehicle, typically autonomous, that requires assistance to traverse a challenging situation. The physical vehicle 100, typically autonomous, is traveling along a roadway 102, and receiving support from a remote support system using virtual vehicle 104. As will be explained in further detail below, the virtual vehicle 104 is not actually present in the physical environment, but rather is virtually superposed upon it, in such a way that it is perceived by the vehicle 100 through suitable interfaces, as though it were physically present.

Figure 1B:
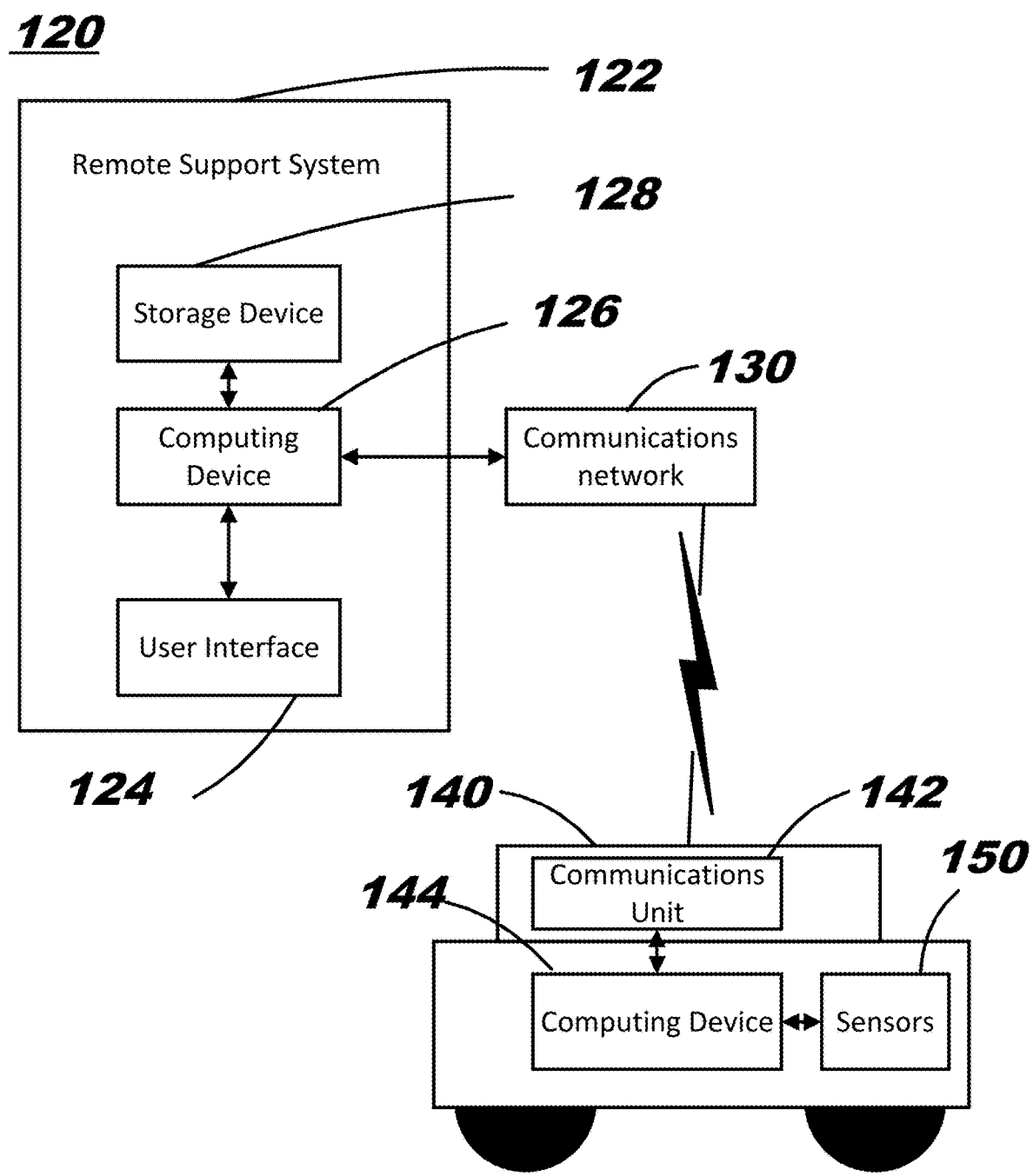
FIG. 1B depicts a function block diagram of a process by which a remote support system can communicate and provide support to a vehicle.

FIG. 1B shows a block diagram of a system for implementing support of a physical vehicle using a virtual vehicle controlled by a remote support system, and in another embodiment a virtual augmented support environment that provides broader support in addition to a virtual vehicle. The system 120 of FIG. 1B includes: a remote support system 122, including a user interface 124, a computing device 126, a storage device 128; a communications network 130; and a vehicle 100 including a communications unit 142, a computing device 144, and a plurality of sensors 150.

The vehicle 100 may be typically under the autonomous control of a system within the vehicle 100. Edge case situations may occur when it is preferable that the autonomous system is provided with support from some external source. This is of particular importance in potentially dangerous and/or unknown situations, in order to preserve the safety of vehicle passengers, and people and objects in the vehicle's surroundings. These edges case situations may occur due to a variety of different scenarios. Some examples are: a situation that is outside of the operating design domain of the autonomous system in the vehicle 100, such as temporary roadworks that change the regular roadway; by passenger request; due to detected vehicle faults; or by request of some party outside the vehicle 100, such as law enforcement or emergency personnel. The embodiment described here includes a single vehicle 100 receiving support; however, a remote support system 120 can be implemented to support multiple vehicles, where, for example, there are single units of a computing device 126 and a storage device 128, and these are connected to a plurality of other units; for example, multiple units of the user interface 124 in order to enable a plurality of natural persons or robotic AI agents to work with the remote support system 122 simultaneously to support a plurality of vehicles.

The user interface 124 for use by a natural person or a robotic AI agent may be implemented, for example, similar to standard vehicle controls, comprising a steering wheel, an acceleration pedal, and brake pedal. The user interface 124 is used to control the movement of a virtual vehicle within the physical environment. The user interface 124 is connected communicatively to a computing device 126 that performs processing of data. A storage device 128 that is connected communicatively to the computing device 126 is implemented, for example, to store data relating to user information and data relating to remote support. A communications network 130 is communicatively coupled to the computing device 126, and may be any type of network or combination of networks known in the art, for transmitting data to the vehicle 100 from the remote support system 122, and for receiving data from it.

The vehicle 100 is an entity that is to receive remote support. The communications unit 142 is connected communicatively to the communications network 130, and can transmit and receive data across a plurality of networks suitable for communication with the communications network 130. The computing device 144 is connected communicatively with the communications unit 142, and for example, implements the processing related with the method of collecting data from the sensor block 150, that comprises a plurality of sensors, providing data to the remote support system 122, and interpreting instructions received from the remote support system 122.

Referring now to FIG. 2, a flowchart 200 describing the steps in a process for implementing an instance of a virtual augmented support environment, as one embodiment of the disclosure.

At step 202, a request for remote support is initiated. This may occur due to a plurality of different sources including a decision by the control system of vehicle 100, a passenger request, or a request external to the vehicle 100, such as by a law enforcement official.

At step 204, the remote system 122 indicates that it is ready to receive data.

At step 206, the vehicle 100 sends telemetry data to the remote support system 122 including aggregated data from the plurality of sensors 150 in the vehicle 100, as well as other data regarding the vehicle status. The data may also include also data regarding passenger status and characteristics of the physical environment.

At step 208, the remote support system 122 initiates an interaction with the vehicle 100. An example of this step is the initiation of a virtual vehicle element 104 that is superimposed on a simulated environment that corresponds to the physical environment in the locality of the vehicle 100. Alternatively, the remote support system 122 may initiate a virtual augmented support element, such as will be described in FIG. 5, that includes a plurality of other elements in addition to the virtual vehicle. The remote support of the virtual vehicle 104 may be directed by a natural person or robotic AI agent that automatically generates the remote support control. In another embodiment, the remote support may be achieved by a combination of a natural person and an automatic component.

At step 210, the vehicle recognizes the presence of the virtual augmented support element. In certain embodiments, for example, the vehicle computing device 144 may initiate a "follow mode" in which a special processing component identifies and tracks the elements of the virtual augmented support environment. In one embodiment, the autonomous control of the physical vehicle 100 may set a location relative to the virtual vehicle 104 such that the vehicle 100 follows a path through the physical environment that corresponds to a path of the virtual vehicle 104 through the simulated environment corresponding to the physical environment. The autonomous control of the physical vehicle 100 then tracks the movement of the virtual vehicle 104 in order to maintain the position of the physical vehicle 100 relative to the virtual vehicle 104. During this tracking process, the safety mechanisms of the autonomous system in the physical vehicle 100, for example, for object avoidance and safe vehicle control, would continue to function. The provision of the virtual augmented support environment operated and controlled by the remote support system 122 provides an extra safety tier. In another embodiment, the virtual augmented safety environment may deliver other data including, for example, those listed as elements within FIG. 4A The autonomous control system of the physical vehicle 100 may include the provided data to better track the traverse of the virtual vehicle 104, and enhance to level of object avoidance.

At step 212, the remote support system 122 controls the position of the virtual augmented support vehicle 104 within the simulated environment corresponding to the physical environment. For example, the remote support system 122 controls navigation of the virtual vehicle 104 through the simulated environment to generate navigation controls for the virtual vehicle 104 that causes the virtual vehicle to follow a path followed by the vehicle 100 in order to guide the physical vehicle 100 through the physical environment. The remote support activity may extend much further, for example by marking obstacles in the physical environment that processing in the vehicle system may not previously have processed and recognized correctly. The vehicle 100 follows the virtual vehicle 104 superimposed on the perceived physical environment by the virtual augmented support element. A more detailed description of one embodiment is described in FIG. 3.

At step 214, the remote support system 122 completes support of the vehicle 100, indicates completion to the vehicle 100, and ceases operation of the virtual augmented support environment.

At step 216, the vehicle 100 recognizes the deletion of the virtual augmented support environment and virtual vehicle, and control returns to normal operation in which the autonomous drive system of the vehicle 100 controls navigation of the vehicle 100 in the absence of the virtual vehicle 104.

Turning now to FIG. 3A, a flowchart 300 is described that gives an example of an embodiment of step 212 in more detail. It describes the processes that may occur during the control of the virtual vehicle 104 by the remote support system 122. During step 302, the remote support system 122 selects which of a plurality of modes to use to support the physical vehicle 100. In the example flowchart 300, three possible options are included. The three modes described here are (1) support by a teleoperator controlling the travel of the virtual vehicle 104 through the user interface 124; (2) support by the remote support system 122 based on a plurality of markers as desired locations to traverse during the remote support phase; and (3) support by the remote support system 122 based on previously utilized routings.

Considering the options for remote support by a teleoperator, step 304 steps 306, 308 and 310, are repeated in a cycle until the end of the remote support phase. In step 304, a manual drive mode is selected. During step 306, the natural person or robotic AI agent controls the movement of the virtual vehicle 104 as superposed on the simulated environment corresponding to the physical environment. This control may use standard vehicle interfacing such as a steering wheel, and acceleration and brake pedals or, as discussed previously, may be based on different interfacing, such as joysticks, touchscreens, and other human interfaces. Thus, the remote support system 122 receives manual navigation inputs (e.g., steering and acceleration controls) that controls the virtual vehicle 104 along a particular path through the simulated environment. The physical vehicle 100 may receive updates of the position of the virtual vehicle 104 in real-time or substantially real-time (e.g., with some latency) and follow the virtual vehicle 104 using its automated drive system.

In step 308, the remote support system 122 assesses whether the support phase is completed. If the support phase is still ongoing, step 310 may use the monitoring steps in sub-flow diagram 350, shown in FIG. 3B, to update the data regarding the perceived environment. The flow then returns to step 306 for a new cycle.

If the option for support based on a set of traversed location points is selected as in step 312, then in step 314, a set of points on the desired route to be traversed by the virtual vehicle 104 may be marked by the remote support system 122, for example by indicating on a touch screen at the user interface 124. For example, the set of points may correspond to markers at positions of hazards in the physical environment. In step 316, the remote support system 122 uses the marked traversal points to calculate a safe route for the physical vehicle 100, based on the vehicle's parameters such as its size. In step 318, the remote support system 122 initiates the virtual vehicle 104, and starts directing the movement of the virtual vehicle 104 through the physical environment.

In step 320, the remote support system assesses 122 whether the support phase is completed. If the support phase is still ongoing, step 322 may use the monitoring steps in sub-flow diagram 350, shown in FIG. 3B, to update the data regarding the perceived environment. The flow then returns to step 318 for a new cycle.

If the option for remote support based on previously used route is selected in step 324, then in step 326, the remote support system 122 loads previously used routes. For example, in step 328 the remote support system 122 identifies a location corresponding to the physical environment of the vehicle 100 and obtains, based on the identified location, selects a pre-recorded safe route for the physical vehicle 100 that avoids hazards in the physical environment, based on the vehicle's parameters, such as its size. In step 330, the remote support system 122 starts to move the virtual vehicle 104 through the physical environment.

In step 332, the remote support system assesses whether the support phase is completed. If the support phase is still ongoing, step 332 may use the monitoring steps in sub-flow diagram 350, shown in FIG. 3B, to update the data regarding the perceived environment. The flow then returns to step 330 for a new cycle.

FIG. 3B describes an embodiment of the steps of a sub-flow diagram 350. The example given here is one possible implementation of an embodiment, though it will be clear that these steps may be implemented in different orders for an equivalent system within the disclosure. Also, steps may be added, deleted and substituted within the scope of this disclosure.

During step 352, the physical vehicle 100 may send updated information from sensors 150 to the remote support system 122. For some sensor information, this may be raw data, while for other information, the sensor data may be processed and aggregated before transmission. In step 354, the remote support system 122 may monitor parameters of the physical vehicle 100 that is following the virtual vehicle 10. Examples of relevant parameters are position, speed and heading. These parameters can be used to ensure that the physical vehicle 100 remains within a desired range envelope relative to the virtual vehicle 104. In step 356, the remote support system 122 may update information on perceived obstacles. The obstacle set may change over time, for example, if other vehicles have changed their position relative to the physical vehicle 100 and virtual vehicle 104 and, for example, if people or animals move into the expected region to be traversed. In step 358, the remote support system 122 may update the marked obstacles to provide updated warning on dangerous situations, and may also provide this updated information to the physical vehicle 100 through the virtual augmented support environment. In step 360, the remote support system 122 may update the information on safe routing. In step 362, the remote support system 122 may update the physical vehicle 100 with information regarding remaining remote support, using parameters such as remaining time, and remaining distance.

Figure 4A:
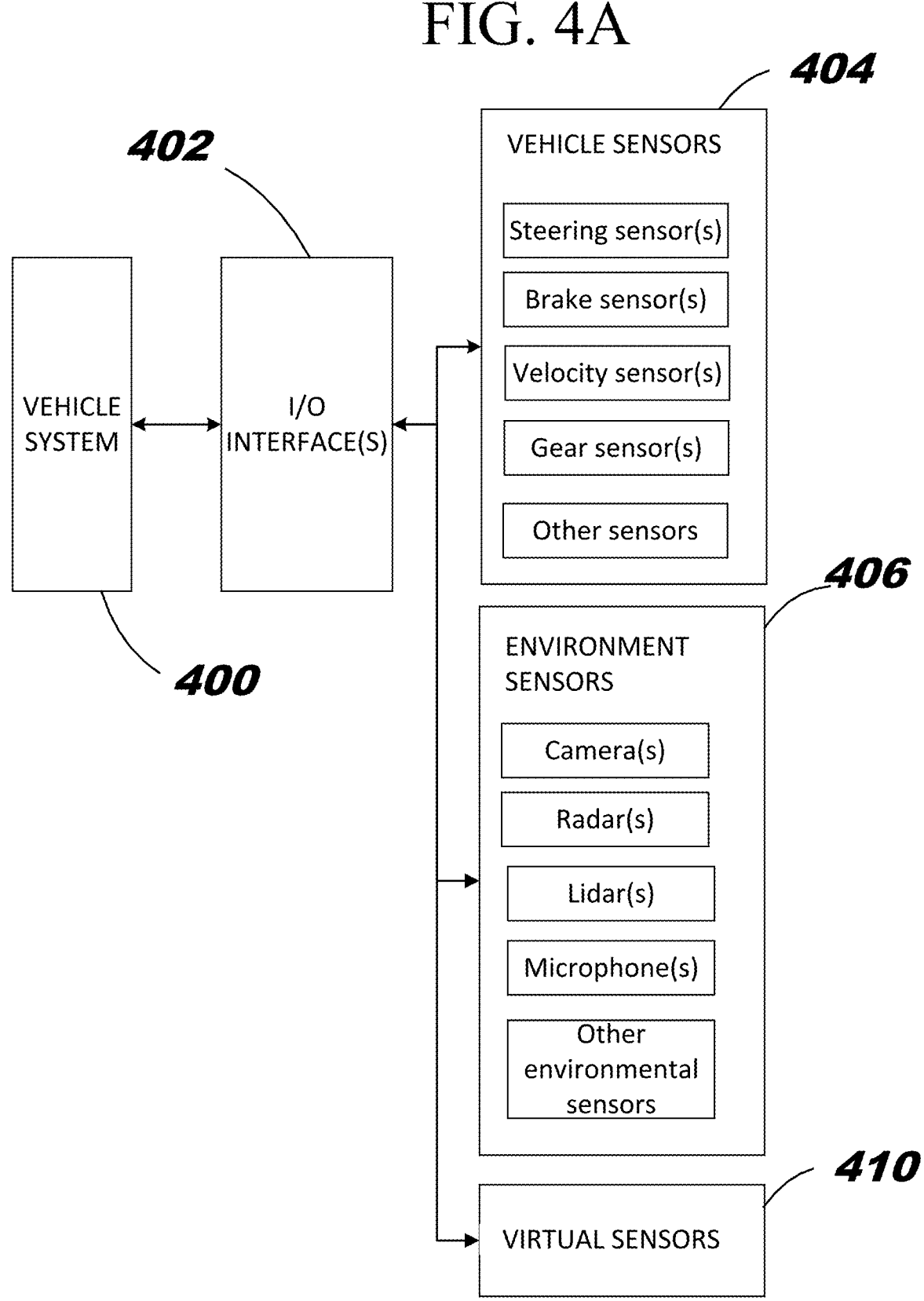
FIG. 4A illustrates a function block diagram of a virtual support element that can be interfaced into the sensed environment of the physical vehicle.

FIG. 4A illustrates in a block diagram of an embodiment of a vehicle system 400 and associated elements that can superimpose the virtual augmented support environment on a simulated environment corresponding to the physical environment. The vehicle system 400 is connected communicatively to an input/output interface unit 402 that interfaces with sensors comprising vehicle sensors 404, environment sensors 406, and virtual sensors 410. The vehicle system 400 may include a plurality of sub-elements related to the management of the vehicle. The input/output interface 402 manages configuration of the sensors, and acquisition of the data from the sensors.

The block denoted as vehicle sensors 404 is a generic representation of a plurality of sensors relating to monitoring and measurement of the vehicle itself. Examples of the sensors in this category may include one or more of steering sensor(s) to monitor angle of the steering wheel; brake sensor(s) to monitor position and status of the brakes; velocity sensor(s) to monitor speed and direction of the vehicle; gear sensor(s) to monitor the state of the gearing.

The block denoted as environment sensors 406 is a generic representation of a plurality of sensors related to monitoring and measuring of the physical environment surrounding the vehicle. Examples of the sensors in this category may include one or more of camera(s); radar(s); lidar(s); microphone(s). The block denoted as virtual sensors 410 is a generic representation of the data provided by a remote support system 122 that creates a virtual augmented support environment superposed upon the physical environment. These elements of information relate to the virtual vehicle 104 as though it were physically present within the physical environment. Additionally, extra elements of information may be provided regarding the physical environment as though these elements were actually sensed by physical sensors, such as obstacles.

Figure 4B:
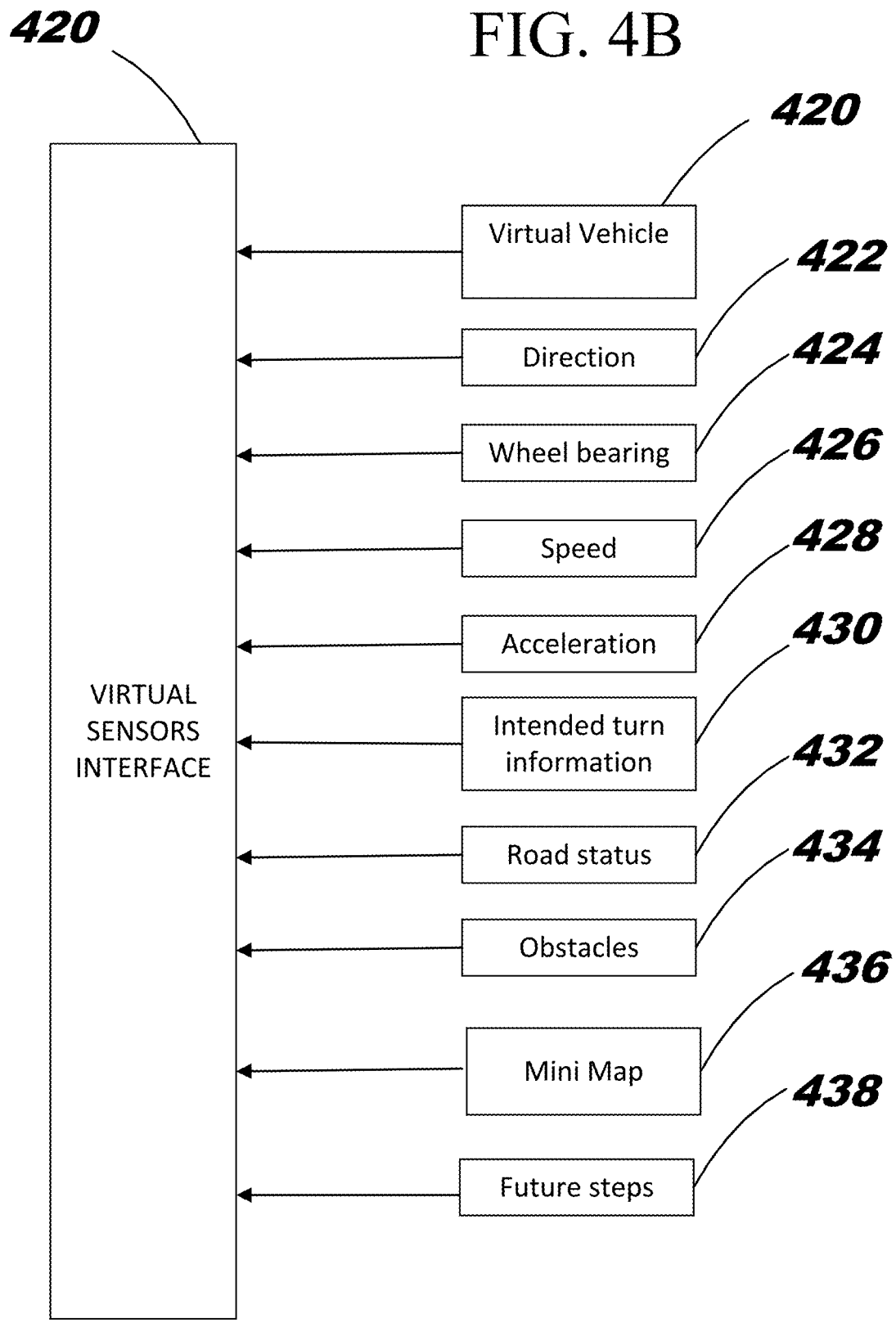
FIG. 4B illustrates an embodiment of a virtual assistance support environment that provides a plurality of auxiliary data to better facilitate the ability of the vehicle to follow the virtual support element.

FIG. 4B illustrates in a block diagram of an example of an embodiment of the virtual sensors block 410. The virtual sensors block 410 may comprise a virtual sensors interface 420 connected to a plurality of virtual sensors, e.g., a directional sensor 422, a wheel bearing sensor 424, a speed sensor 426, an acceleration sensor 428, an intended turn information unit 430, a road status unit 432, an obstacle unit 434, a mini-map unit 436, and future steps unit 438. The mini-map unit 436 may provide enhanced information regarding the environment ahead that may be beyond the range of the sensors of the autonomous vehicle 100; this may be, for example, be provided by highway road information systems. Future steps unit 438 may provide information to the autonomous vehicle regarding intended upcoming changes in speed and direction of the virtual vehicle, which may be used by the autonomous vehicle to better track the virtual vehicle.

Block 420 comprises a virtual element superposed on the physical environment, by the remote support system 122 that represents an entity that the vehicle recognizes as being a non-physical element. Further, the vehicle 100 in some embodiments will travel after the virtual vehicle 104 in a follow-me mode.

In further description of possible implementations of various embodiments, the term 'virtual vehicle' is used to denote the 'virtual element'. The virtual element may take several forms. For example, the virtual element can be depicted as the outline of a vehicle or it may be depicted in another equivalent form such as a block or combination of blocks, as a line or lines, as a point, or in various other formulations.

Further, a plurality of other information elements may be provided at the virtual sensors interface 420. Examples of such information elements may include, for example, a direction sensor 422 and wheel bearing sensor 424 that may provide information on the direction of the virtual vehicle 104, and its changing direction respectively; a speed sensor 426 and acceleration sensor 428 that may provide information on the current speed of the virtual vehicle 104, and the current acceleration value respectively. An intended turn information unit 430 may be implemented that provides information regarding anticipated turns. A road status unit 432 may be implemented that provides information on the status of the road on the anticipated route ahead, and in its locality, for example, road surface type, road contours, road wetness and/or ice coverage. An obstacle unit 434 may provide information regarding obstacles on and around the anticipated route.

The support environment may additionally include virtual guidelines and estimation projections. In one embodiment, a virtual element such as a line is superimposed on a video feed viewable by a remote support system 122. The virtual element may be positioned in such a way as to reflect the estimated position of the vehicle's front in case an emergency stop procedure is initiated immediately. In another embodiment, such a virtual element is positioned to reflect the estimated position of the vehicle's front in case deceleration and halt is performed in an orderly manner. In another embodiment, a virtual element is positioned to reflect the position occupied by the vehicle front at the moment of frame rendering. Since network latency and other processing effects may delay transmission and display of a video frame, the actual current vehicle position may differ noticeably from the one where the current video frame was recorded. Such a virtual line or a similar visual cue may assist the operator in planning subsequent driving commands. In another embodiment, two virtual lines enveloping the lateral extent of the vehicle over the desired time interval may be superimposed on the video feed, assuming that the steering angle or its derivative of the desired degree remains constant during this time. Such lines may be interpreted as the outline of the predicted trajectory of the vehicle.

FIGS. 5A-D illustrates the superposing of the virtual augmented support environment and virtual vehicle 104 onto the physical environment perceived by the vehicle 100.

Figure 5A:
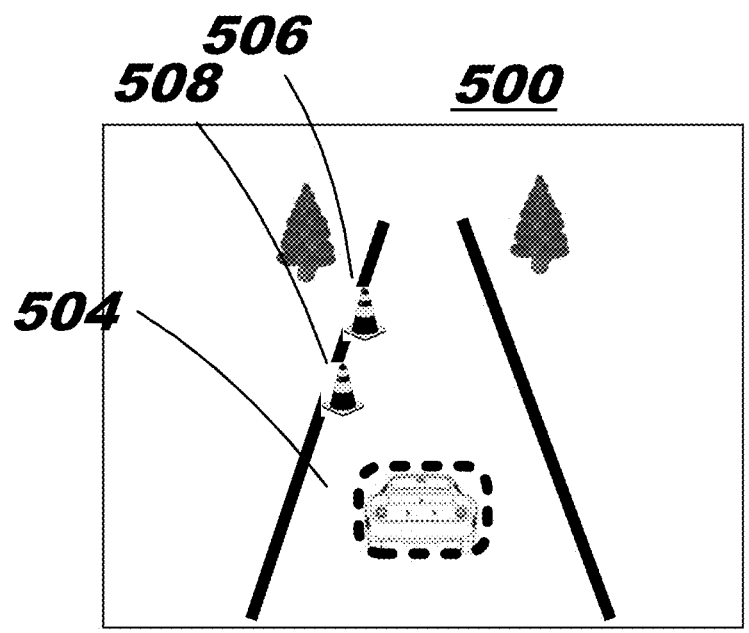
FIG. 5A illustrates an example of a physical environment as sensed by the autonomous vehicle.

FIG. 5A is a view 500 showing the perceived physical environment ahead of the vehicle 100. In this example, the vehicle 100 is travelling on a roadway 504 and receiving the virtual augmented system support. Also shown are obstacles 506 and 508 on the roadway 504.

Figure 5B:
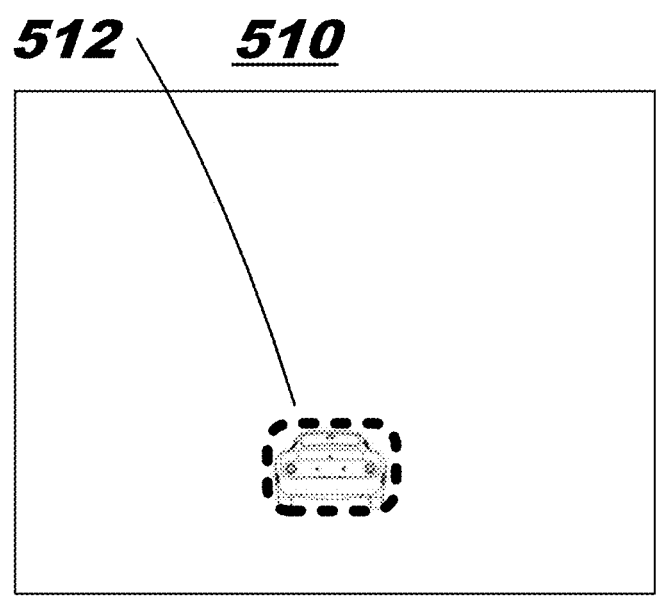
FIG. 5B illustrates the virtual augmented support environment that is to be superposed on the environment perceived by the physical vehicle.

FIG. 5B shows the virtual augmented support environment 510 that is to be superposed on the physical vehicle perception. In this example, the virtual augmented support element comprises a virtual vehicle 512. In further embodiments, the virtual augmented support environment 510 comprises a plurality of features in addition to a virtual vehicle 512.

Figure 5C:
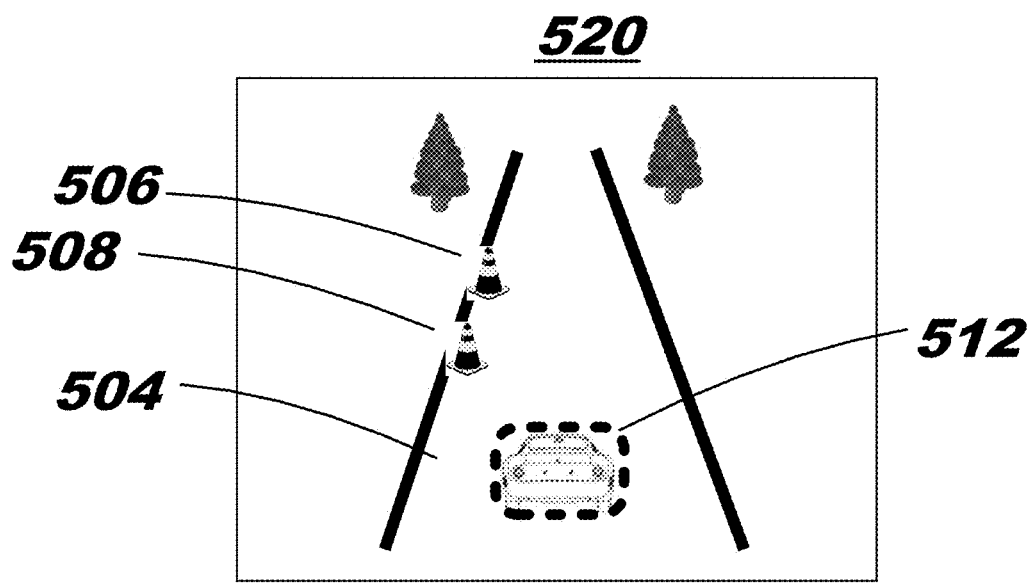
FIG. 5C illustrates the virtual augmented support environment superposed on the environment perceived by the physical vehicle.

FIG. 5C shows superposition of the virtual augmented support environment 510 upon the perceived physical environment 500, with the virtual vehicle 512 superimposed on sensed physical environment.

Figure 5D:
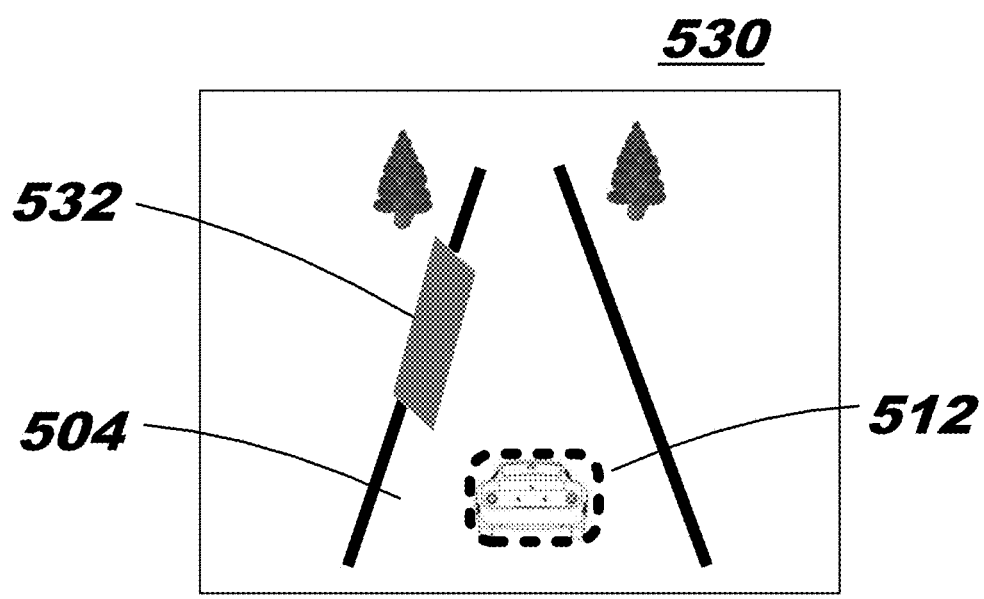
FIG. 5D illustrates an example of a broader virtual augmented support environment that includes marking of obstacles in addition to a virtual vehicle.

FIG. 5D shows an example of a broader virtual augmented support environment; in this case the obstacle elements 506 and 508 are annotated in the virtual environment by a marker element 532, which indicates to the autonomous system of the vehicle 100 that this is a danger region, and is an area to be avoided.

Figure 6A:
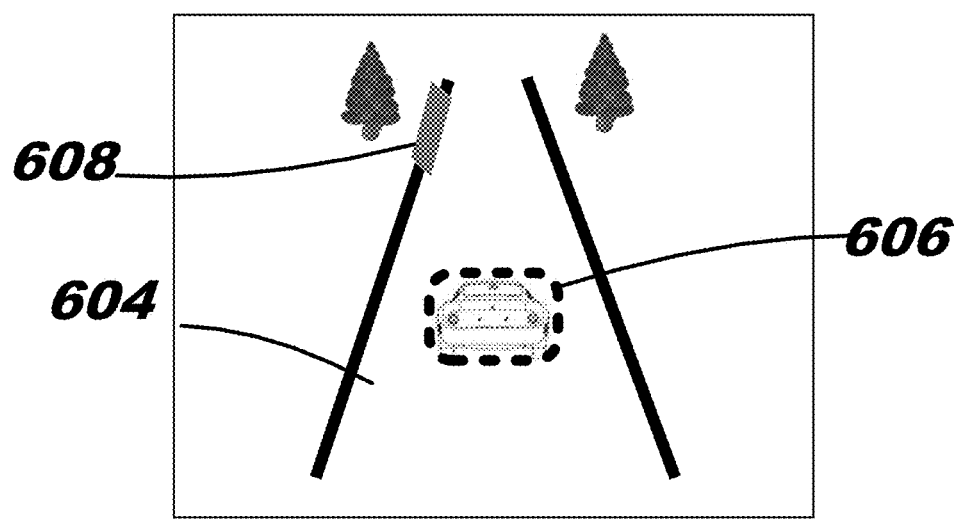
FIG. 6A shows an example of a road ahead as perceived by the physical vehicle.
Figure 6B:
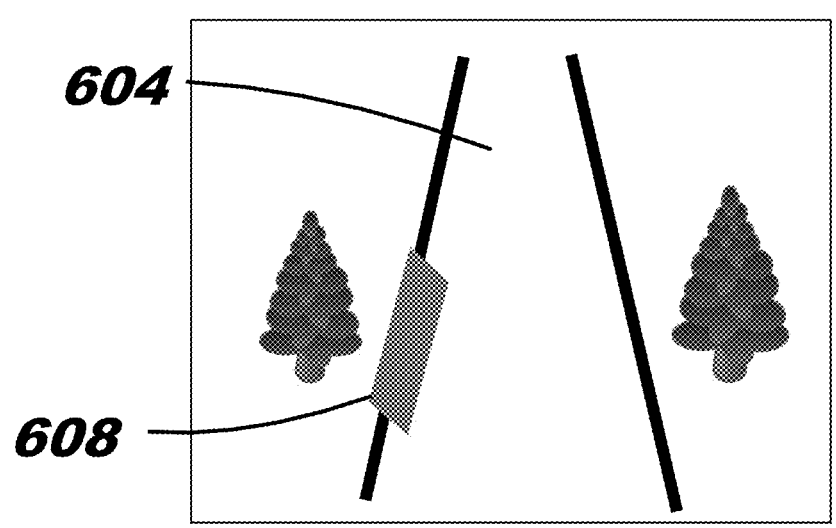
FIG. 6B shows an example of the road ahead, as would be perceived by a virtual vehicle, if it were present at the location at which it is superposed on the physical environment.

Referring now to FIGS. 6A-B, a virtual augmented environment is projected forward from a physical vehicle environment. In this way, the remote support system 122 can perceive the physical environment as though the virtual vehicle 606 were to actually be present in the physical environment at the position it is superposed.

FIG. 6A shows the perceived environment 600 as perceived by the vehicle 100, with the virtual augmented support environment superposed. The virtual augmented support environment comprises the virtual vehicle 606 and an annotated obstacle shown by the obstacle marker 608.

FIG. 6B shows a projected view 610, as though viewed from the position of the virtual vehicle 606 as it is superposed in the physical environment, projected from physical vehicle view provided from the physical vehicle 100. The same elements, and marked obstacle 606, appear in the view, however they now appear much closer than in view 600, the distance according to the distance of the virtual vehicle 606 position from the said objects. To generate the projected view 610, the remote support system 120 receives a video stream (e.g., from a camera in the vehicle 100) corresponding to a view of the physical environment seen by the vehicle 100. The projected view 610 of a simulated environment corresponding to the physical environment is projected based on the video stream to generate a view corresponding to a perspective of a virtual driver in the virtual vehicle 104. The projected view 610 may be presented to the remote support system 122 to assist in controlling the virtual vehicle 104.

Figure 7A:
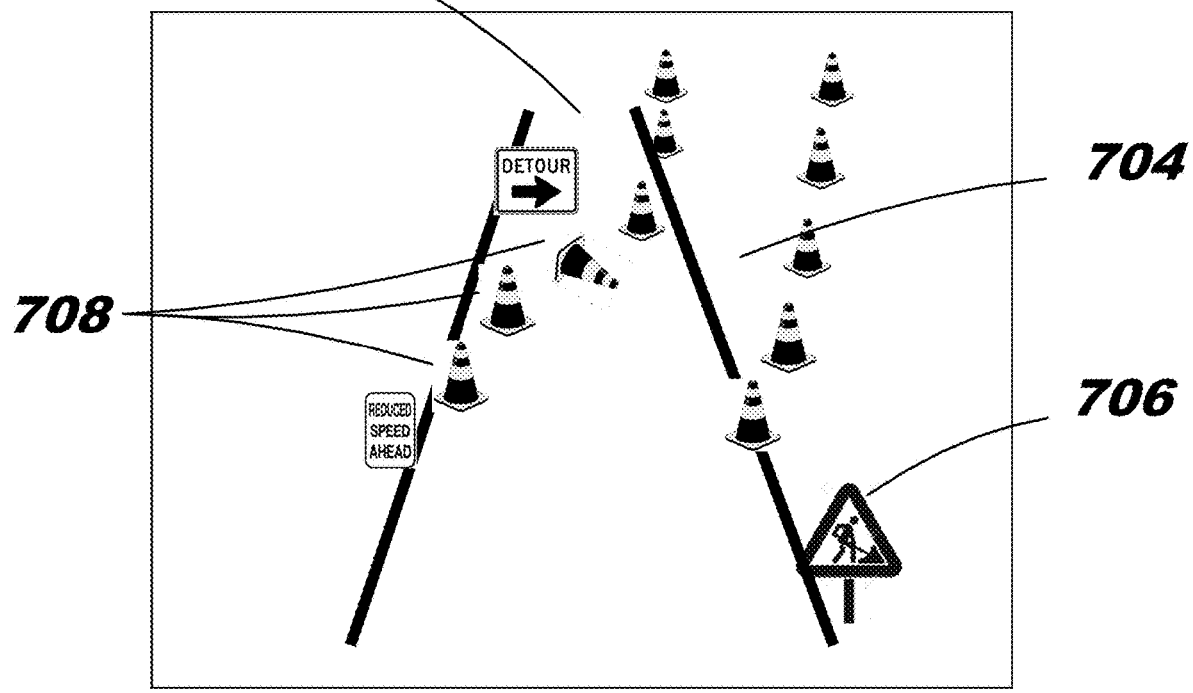
FIG. 7A shows an example of a road construction area as perceived by an autonomous vehicle.
Figure 7B:
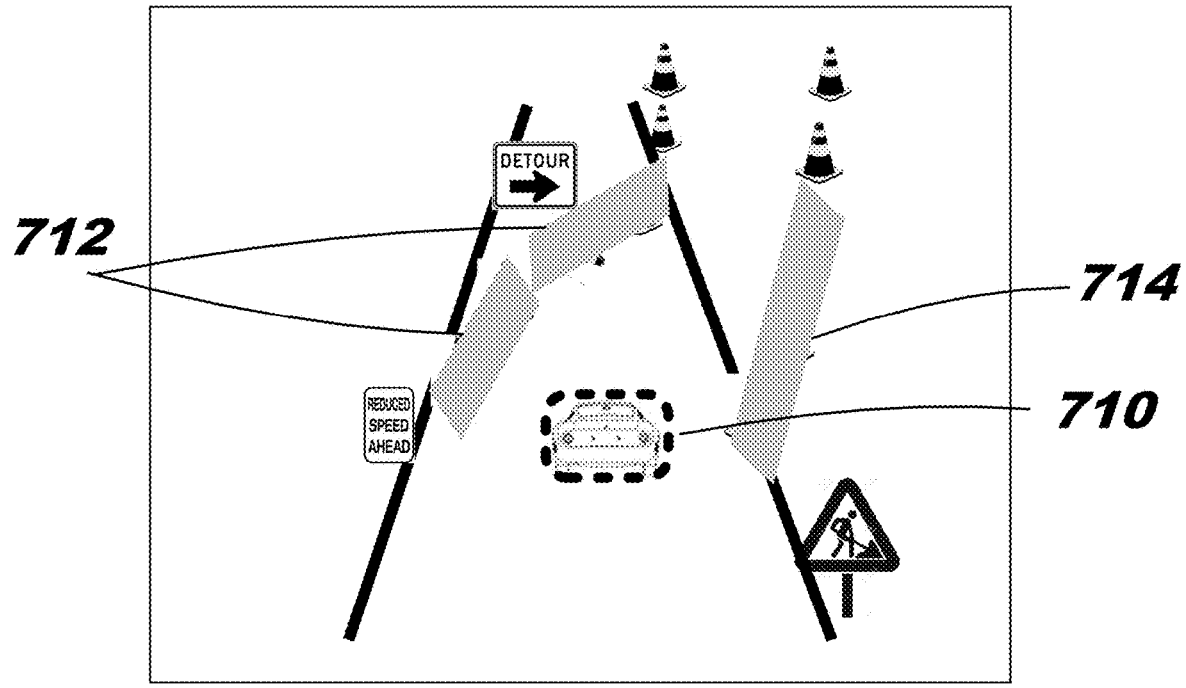
FIG. 7B shows an example of a road construction area with the virtual augmented support environment superposed on the view of the autonomous vehicle.

FIG. 7 illustrates the application of the virtual augmented support environment in an area undergoing road construction. A road construction area is likely to be significantly different from available data, in the form of maps, and/or information aggregated from other sources, such as vehicles that have previously passed. An example of road construction area is shown in FIG. 7A. Previous lanes 702 may have been replaced by a new lane configuration 704; additional signage may have been added, for example sign element 706. This scenario, and many other similar scenarios are easily interpreted by a natural person, but may be outside of the operational design domain of a vehicle 100, and the autonomous system may not be able to address it in order to safely progress through this region. In such a scenario, either the autonomous system, the passenger, or an external party may initiate a process to receive assistance, through the initiation and use of a virtual augmented support environment. FIG. 7B shows the superposition of a virtual augmented support environment. A virtual vehicle 710 is superposed appropriately within the sensed physical environment, and it guides the physical vehicle through the environment, which may be accomplished in an embodiment such as described in FIG. 3. In addition, obstacles, such as road cone elements 708, for example, may be indicated in the virtual augmented support environment by obstacle marker elements 712 and 714 as regions to avoid.

FIG. 8, illustrates an example of a bird's eye view that may be provided to the remote support system 122, and/or at the user interface 124. This view can be composed using information from multiple sources including the environment as sensed by the physical vehicle 100, data from other vehicles that are or have been in the locality, online map data, and published information regarding changes in highway arrangements during road construction. In this example, the illustration shows the roadway 802 and the position of the physical vehicle 804. Also superposed is the top view of the virtual augmented support environment, showing the virtual vehicle 806, and two obstacles denoted obstacle 808 and obstacle 810. In this example of an embodiment, the virtual vehicle 806 shown as having a width w V that is wider than the width of the physical vehicle 804 shown as wP.

Figure 9:
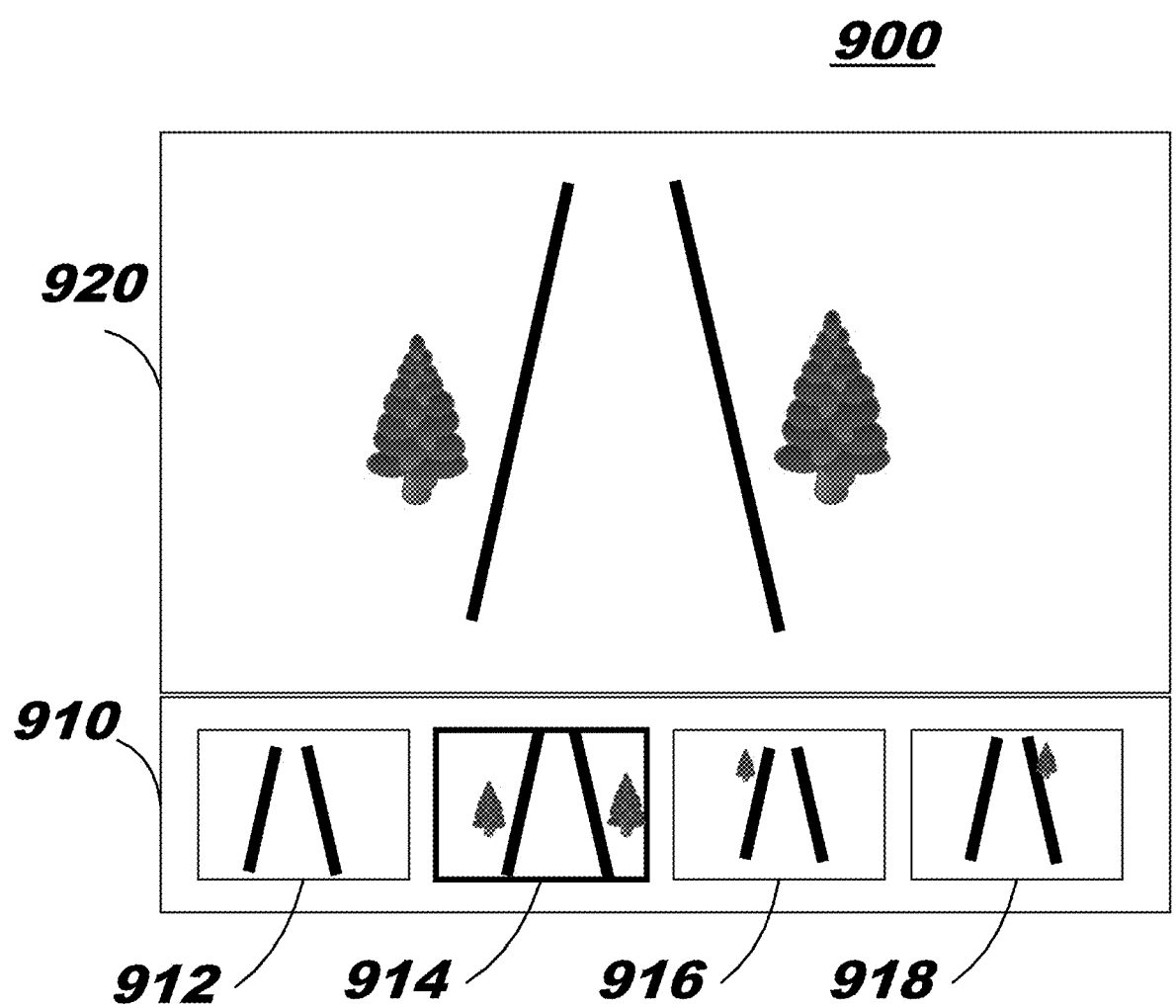
FIG. 9 illustrates a block diagram of an example of a method and system by which a remote support system can provide support to multiple vehicles simultaneously.

FIG. 9 illustrates an example of an embodiment of a method by which a remote support system 122 can manage interactions with several vehicles simultaneously through a single user interface 124. The user interface 124 is shown here as a visual interface 900 consisting of a control area 910, and a viewing area 920. The control area 910 shows multiple connections with vehicles. In this case four connections are shown, connections 912, 914, 916 and 918. One of the connections can be selected for interaction. Selection of the chosen vehicle for interaction can be made, for example, by touch for a touchscreen and/or by audio voice control. The selected vehicle connection, element 914, may then appear in an enlarged version on the viewing area 920. In the example given, a simple display layout is shown in the viewing area 920, though it will be understood that the display can be composed of a plurality of information and display elements, including but not limited to auxiliary information, such as mapping of the area, information on the vehicle status and the like.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

The invention claimed is:

1. A method for providing remote assistance to guide a vehicle through a real-world physical environment, the method comprising:
   receiving, from the vehicle at a remote support system, a request for support and telemetry data representing characteristics of the real-world physical environment sensed by the vehicle;
   generating at the remote support system based on the telemetry data, a representation of a computer-simulated environment that simulates features of the real-world physical environment;
   instantiating, by the remote support system, a virtual support element superimposed in the computer-simulated environment that simulates the real-world physical environment;
   causing the vehicle to operate in a follow mode in which the autonomous drive system of the vehicle controls the vehicle to follow a path through the real-world physical environment corresponding to a path of the virtual support element through the computer-simulated environment;
   generating, at the remote support system, a virtual view of the computer-simulated environment from a perspective of a virtual driver of the virtual support element;
   presenting the virtual view on a display for assisting a remote teleoperator in controlling the virtual support element;
   obtaining, at the remote support system, navigation controls for controlling the virtual support element;
   controlling, by the remote support system, virtual navigation of the virtual support element through the computer-simulated environment based on the navigation controls;
   prior to detecting an updated position of the vehicle responsive to the navigation controls, updating the virtual view of the computer-simulated environment based on the virtual navigation; and
   transmitting to the vehicle, position information associated with the virtual navigation of the virtual support element through the computer-simulated environment to guide the vehicle operating in the follow mode through the real-world physical environment.

2. The method of claim 1, further comprising:
   detecting completion of the vehicle traversing through the real-world physical environment;
   causing the vehicle to cease recognition of the virtual support element; and
   causing the vehicle to return to a normal mode in which the autonomous drive system controls navigation of the vehicle in absence of the virtual support element.

3. The method of claim 1, wherein obtaining the navigation controls comprises:
   receiving, by the remote support system, manual steering and acceleration inputs from a teleoperator; and
   generating the navigation controls based on the manual steering and acceleration inputs.

4. The method of claim 1, wherein controlling the virtual navigation of the virtual support element through the computer-simulated environment comprises:
   receiving, by the remote support system, locations of markers in the computer-simulated environment corresponding to locations of hazards in the real-world physical environment; and
   automatically generating the navigation controls to traverse through the simulated environment while avoiding the markers.

5. The method of claim 1, wherein controlling the virtual navigation of the virtual support element through the computer-simulated environment comprises:
   identifying a location of the real-world physical environment of the vehicle;
   obtaining, based on the identified location, a pre-recorded route through the real-world physical environment that avoids hazards in the real-world physical environment; and
   automatically generating the navigation controls to control the virtual support element based on the pre-recorded route.

6. The method of claim 1, wherein generating the virtual view comprises:
   generating a virtual guideline superimposed on a position of the vehicle as a visual cue to assist the remote support system in navigating the virtual support element.

7. The method of claim 1, wherein instantiating the virtual support element comprises:
   generating the virtual support element as a virtual vehicle having a width at least as wide as a width of the vehicle.

8. A non-transitory computer-readable storage medium storing instructions for providing remote assistance to guide a vehicle through a physical environment, the instructions when executed by a processor causing the processor to perform steps including:
   receiving, from the vehicle at a remote support system, a request for support and telemetry data representing characteristics of the real-world physical environment sensed by the vehicle;
   generating at the remote support system based on the telemetry data, a representation of a computer-simulated environment that simulates features of the real-world physical environment;

instantiating, by the remote support system, a virtual support element superimposed in the computer-simulated environment that simulates the real-world physical environment;

causing the vehicle to operate in a follow mode in which the autonomous drive system of the vehicle controls the vehicle to follow a path through the real-world physical environment corresponding to a path of the virtual support element through the computer-simulated environment;

generating, at the remote support system, a virtual view of the computer-simulated environment from a perspective of a virtual driver of the virtual support element;

presenting the virtual view on a display for assisting a remote teleoperator in controlling the virtual support element;

obtaining, at the remote support system, navigation controls for controlling the virtual support element;

controlling, by the remote support system, virtual navigation of the virtual support element through the computer-simulated environment based on the navigation controls;

prior to detecting an updated position of the vehicle responsive to the navigation controls, updating the virtual view of the computer-simulated environment based on the virtual navigation; and transmitting to the vehicle, position information associated with the virtual navigation of the virtual support element through the computer-simulated environment to guide the vehicle operating in the follow mode through the real-world physical environment.

9. The non-transitory computer-readable storage medium of claim 8, the instructions when executed further causing the processor to perform steps including:

detecting completion of the vehicle traversing through the real-world physical environment;

causing the vehicle to cease recognition of the virtual support element; and causing the vehicle to return to a normal mode in which the autonomous drive system controls navigation of the vehicle in absence of the virtual support element.

10. The non-transitory computer-readable storage medium of claim 8, wherein obtaining the navigation controls comprises:

receiving, by the remote support system, manual steering and acceleration inputs from a teleoperator; and generating the navigation controls based on the manual steering and acceleration inputs.

11. The non-transitory computer-readable storage medium of claim 8, wherein controlling the virtual navigation of the virtual support element through the computer-simulated environment comprises:

receiving, by the remote support system, locations of markers in the computer-simulated environment corresponding to locations of hazards in the real-world physical environment; and automatically generating the navigation controls to traverse through the simulated environment while avoiding the markers.

12. The non-transitory computer-readable storage medium of claim 8, wherein controlling the virtual navigation of the virtual support element through the computer-simulated environment comprises:

identifying a location of the real-world physical environment of the vehicle;

obtaining, based on the identified location, a pre-recorded route through the real-world physical environment that avoids hazards in the real-world physical environment; and automatically generating the navigation controls to control the virtual support element based on the pre-recorded route.

13. The non-transitory computer-readable storage medium of claim 8, wherein generating the virtual view comprises:

generating a virtual guideline superimposed on a position of the vehicle as a visual cue to assist the remote support system in navigating the virtual support element.

14. The non-transitory computer-readable storage medium of claim 8, wherein instantiating the virtual support element comprises:

generating the virtual support element as a virtual vehicle having a width at least as wide as the width of the vehicle.

15. A computing system comprising:

one or more processors; and a non-transitory computer-readable storage medium storing instructions for providing remote assistance to guide a vehicle through a physical environment, the instructions when executed by the one or more processors causing the one or more processors to perform steps including:

receiving, from the vehicle at a remote support system, a request for support and telemetry data representing characteristics of the real-world physical environment sensed by the vehicle;

generating at the remote support system based on the telemetry data, a representation of a computer-simulated environment that simulates features of the real-world physical environment;

instantiating, by the remote support system, a virtual support element superimposed in the computer-simulated environment that simulates the real-world physical environment;

causing the vehicle to operate in a follow mode in which the autonomous drive system of the vehicle controls the vehicle to follow a path through the real-world physical environment corresponding to a path of the virtual support element through the computer-simulated environment;

generating, at the remote support system, a virtual view of the computer-simulated environment from a perspective of a virtual driver of the virtual support element;

presenting the virtual view on a display for assisting a remote teleoperator in controlling the virtual support element;

obtaining, at the remote support system, navigation controls for controlling the virtual support element;

controlling, by the remote support system, virtual navigation of the virtual support element through the computer-simulated environment based on the navigation controls;

prior to detecting an updated position of the vehicle responsive to the navigation controls, updating the virtual view of the computer-simulated environment based on the virtual navigation; and transmitting to the vehicle, position information associated with the virtual navigation of the virtual support element through the computer-simulated environment to guide the vehicle operating in the follow mode through the real-world physical environment.

16. The computing system of claim 15, the instructions when executed further causing the processor to perform steps including:
   detecting completion of the vehicle traversing through the real-world physical environment;
   causing the vehicle to cease recognition of the virtual support element; and
   causing the vehicle to return to a normal mode in which the autonomous drive system controls navigation of the vehicle in absence of the virtual support element.

17. The computing system of claim 15, wherein obtaining the navigation controls comprises:
   receiving, by the remote support system, manual steering and acceleration inputs from a teleoperator; and
   generating the navigation controls based on the manual steering and acceleration inputs.

18. The computing system of claim 15, wherein controlling the virtual navigation of the virtual support element through the computer-simulated environment comprises:
   receiving, by the remote support system, locations of markers in the computer-simulated environment corresponding to locations of hazards in the real-world physical environment; and
   automatically generating the navigation controls to traverse through the simulated environment while avoiding the markers.

19. The computing system of claim 15, wherein controlling the virtual navigation of the virtual support element through the computer-simulated environment comprises:
   identifying a location of the real-world physical environment of the vehicle;
   obtaining, based on the identified location, a pre-recorded route through the real-world physical environment that avoids hazards in the real-world physical environment; and
   automatically generating the navigation controls to control the virtual support element based on the pre-recorded route.

20. The computing system of claim 15, wherein generating the virtual view comprises:
   generating a virtual guideline superimposed on a position of the vehicle as a visual cue to assist the remote support system in navigating the virtual support element.

* * * * *